United States Patent [19]

Joensen

[11] Patent Number: 4,505,004

[45] Date of Patent: Mar. 19, 1985

[54] PROCESS FOR SHUCKING AND EVISCERATING SCALLOPS

[75] Inventor: Jon O. Joensen, Holte, Denmark

[73] Assignee: Matcon Rädgivende Ingeni rfirma ApS., Herlev, Denmark

[21] Appl. No.: 519,774

[22] PCT Filed: Nov. 12, 1982

[86] PCT No.: PCT/DK82/00101

§ 371 Date: Jul. 15, 1983

§ 102(e) Date: Jul. 15, 1983

[87] PCT Pub. No.: WO83/01727

PCT Pub. Date: May 26, 1983

[30] Foreign Application Priority Data

Nov. 17, 1981 [DK] Denmark ............................. 5096/81
Dec. 11, 1981 [DK] Denmark ............................. 5502/81

[51] Int. Cl.³ ............................................. A22C 29/04
[52] U.S. Cl. ........................................... 17/48; 17/51; 17/74
[58] Field of Search ................... 17/48, 71, 51, 45, 74, 17/53, 62

[56] References Cited

U.S. PATENT DOCUMENTS

| | | | |
|---|---|---|---|
| 3,513,071 | 5/1970 | Fehmerling | 17/48 X |
| 3,619,855 | 11/1971 | Willis | 17/74 |
| 3,662,432 | 5/1972 | Wenstrom | 17/53 |
| 3,706,333 | 12/1972 | Ammerman | 17/62 X |

FOREIGN PATENT DOCUMENTS 366467 4/1974 Sweden .

*Primary Examiner*—Willie G. Abercrombie
*Attorney, Agent, or Firm*—Schwartz, Jeffery, Schwaab, Mack, Blumenthal & Koch

[57] ABSTRACT

In the shucking and eviscerating of scallops, the yield is increased by treating the scallops, prior to the heat treatment, with a sodium or potassium hydroxide solution, as this results in a more effective loosening of the contents of the scallops from their shells and a complete separation of the valves by the subsequent heat treatment and, furthermore, in a change in the character of the viscera, so that these can more easily be removed from the edible portion without substantial waste of the latter.

6 Claims, No Drawings

PROCESS FOR SHUCKING AND EVISCERATING SCALLOPS

The invention relates to a process for shucking and eviscerating scallops by which the shells are caused to open and the edible portion is removed together with the viscera from which it is separated by mechanical treatment.

In the present specification and claims, the word scallop is used to cover all molluscs of the genus Pecten which comprises almost 300 species, but it goes without saying, however, that only the edible ones are of interest in the present connection. Besides the name of scallop, shellfish of the genus in question are sold under the name of Queen Scallop and "Coquille St. Jacques".

A substantial part of the harvested scallops are processed industrially by operations in which the edible portion of the scallop is removed from the shells and separated from the inedible viscera for being afterwards preserved by freezing or canning.

Until now, this processing of scallops has usually been initiated by subjecting the shellfish to a brief boiling, possibly with steam and possibly at high temperature and pressure in autoclave.

This causes the shells to open but the valves remain connected at the edge acting as a hinge. At the same time, the adherence of the scallop to the inner sides of the shells is greatly weakened, so that it is possible in a following step to shake a substantial part of the scallops out of the shells which have opened.

The part of the scallop which is regarded as edible is constituted by a cylinder-shaped muscle which in the live animal serves as closing muscle, the end of which are each secured to its respective valve. Furthermore, the edible portion may possibly comprise roe.

When the scallop is, as indicated, shaked out of the shell, the edible portion is surrounded by the viscera which are regarded as inedible and have to be removed prior to the further treatment of the edible portion. When this removal is taking place mechanically, use is made of horizontally rotating rollers for rasping off the viscera.

In addition to the said operations, some other cleaning and classifying operations take place before the edible portion of the scallops is ready for preserving, preferably by freezing.

This known process results, however, in a not negligible waste of the edible portion of the scallops which is a comparatively expensive article of food. This waste has two causes. The first is that by shaking the heat-treated scallops, it is not possible to get all the scallops out of the shells and, therefore, between 2 and 10% of the scallops are discarded together with the shells. The second cause is that the subsequent removal of the viscera from the edible portion requires a strong mechanical processing which results also in a not negligible part of said edible portion being removed by the process, for one thing due to the fact that when using the machines necessary for this strong processing, one cannot avoid that some of the shucked whole scallops, in particular the smaller ones, pass through the machines and are discarded together with the viscera, for another thing, due to the fact that the treatment can result in small parts of the edible flesh being removed from the individual scallops.

Attempts have been made at reducing the waste due to said causes by intensifying the preceding heat treatment, using longer time of treatment and/or higher temperatures. It is possible thereby to facilitate to some extent the loosening of the scallops from the shells, but at the same time this results in an unacceptable quality reduction and a lower yield due to reduced water absorption, for which reason such an intensifying of the heat treatment is unsuitable for obviating the said two causes of waste.

Finally, it has been proposed to use an enzyme treatment to facilitate the subsequent removing of edible flesh from marine animals in general, such as oysters, clams, scallops, shrimps, crayfish, sea snails, etc., cf. U.S. Pat. No. 3,513,071. In connection with the processing of scallops, said process presents, however, a number of drawbacks.

As a result of the dimensions and structure of these molluscs, the desired decomposition requires a very long time of treatment. In order to ensure a sufficiently specific treatment, so as to achieve the desired decomposition of viscera, etc. without damaging the edible muscle, it is necessary to control very accurately the time and especially the temperature of treatment, and such an accurate control is difficult to perform when the processing is carried out on an industrial scale. To this must be added that the enzyme treatment is made more complicated by the fact that it requires a previous hot water treatment of the animals. Furthermore, the enzyme treatment may be hazardous, due to the potential risk of enzyme residue in the recovered product, which is objectionable when a heat treatment which could inactivate the enzyme does not take place immediately afterwards, which is not usual with scallops.

The invention has therefore for its object to provide a method of processing scallops whereby an increased yield is obtained without reduction in quality.

This is achieved by a method which according to the invention is characterized by (a) treating the fresh scallops with an aqueous solution of 0.5–20 w/v %, preferably 1–20 w/v %, sodium or potassium hydroxide, during a period between 1 minute and 2 hours, preferably 10–40 minutes, (b) then treating in a conventional manner the scallops with boiling water or steam during 1 second-5 minutes, preferably 10 seconds-1 minute, (c) isolating the edible portion of the scallops with surrounding viscera from the shells which are separated after the treatment of step (b), and (d) removing the viscera from the edible portion by gentle mechanical processing.

The treatment according to step (a) is suitably performed by pouring the sodium or potassium hydroxide solution over the scallops or immersing them therein. After a brief period, the animals are presumably dead and the shells open so that the hydroxide solution has free access to the inside part of the scallop.

The heat treatment, performed in step (b), of the thus previously opened scallops results in a complete separation of the two valves of each scallop, in contrast to what happens when live animals are subjected to a corresponding heat treatment, where the result is just that the shells open.

Due to the fact that the shell valves are thus totally separated and that the scallop itself is either completely loosened from both valves or is very weakly attached to only one of these, it is possible, for instance on a shaking screen having a mesh size which allows the passage of the scallops themselves but not of the shells, to achieve a practically total separation of scallops and shells, so that no scallop flesh is wasted when the shells are discarded.

After the isolation in step (c) of the edible portion of the scallops with surrounding viscera from the shells, the viscera can be removed from the edible portion by a mechanical processing which is substantially more gentle than the roller processing which would be necessary if the processing of the scallops had not been initiated by a treatment with sodium or potassium hydroxide solution. Instead of carrying out this evisceration on the hitherto used rubbing rollers, it is possible by the process according to the invention to perform step (d) by rotation in a drum provided with rugged, preferably perforated walls. This causes practically no waste of the edible flesh of the scallop and the step can be carried out in a substantially cheaper apparatus than the one required for the corresponding known treatment.

It goes without saying that the invention is not limited to any theoretical explanation of the effect achieved, but it is assumed that the improved results are due both to the fact that the hydroxide treatment causes a certain decomposition of the viscera and the tissue attaching the valves together and the tissue attaching the edible portion to the valves, so that the subsequent heat treatment reduces to a very substantial extent the mechanical strength of this tissue, and to the fact that the initial hydroxide treatment results in the scallops being already open at the beginning of the heat treatment, thus making this latter treatment more effective.

It is very surprising that that it is thus possible to achieve so selective an effect of the hydroxide treatment as is the case, since it was to be expected that a treatment capable of decomposing effectively the viscera would at the same time have an unacceptable effect on the edible portion of the scallop. The reason why this is not the case may be the special disposition of the fibers of the edible portion, these fibers running in parallel and having their ends covered by the shells.

Admittedly, it is known that for skinning mackerels they can be subjected to a warm strong sodium hydroxide solution for a short time in order to partly dissolve the skin, no substantial damage being thereby caused to the underlying flesh. The present method cannot, however, be compared with the said known skinning method, as scallops, unlike mackerels, have no layer of fat separating effectively the edible portion from the part to be removed.

If desired, the method according to the invention can be supplemented with a further step with the purpose of preventing scallops processed as stated from having a more slipper surface than if the hydroxide treatment had not been applied. Such slipperiness can be counteracted by performing at any moment after the heat treatment of step (b) a treatment either with acid or with calcium hydroxide. As an acid, use is made preferably of hydrochloric acid in a HCl concentration between 0.05 and 2 w/v %, e.g. 1 w/v %. This acid treatment can be of very short duraation and performed, for instance, by immersion for 1 minute.

As stated, the slipperiness in question can be removed by treatment with calcium hydroxide. Such a treatment will mainly come into consideration in cases where it is desired to obtain the particular advantages with regard to increased keeping qualities and water retention which can be obtained by an increase in the pH value of the edible portion, as described in Danish patent application No. 5096/81.

The method according to the invention can, moreover, also without calcium hydroxide treatment be carried out so as to achieve an increase in pH of at least 0.2 units to a value between 6.6 and 9.5, with the increase in keeping qualities and water retention and improvement in consistency resulting therefrom, cf. the said Danish patent application No. 5096/81. If such a pH increase is desired, use can be made of a comparatively weak hydroxide solution for a comparatively long time within the above-stated limits.

The method according to the invention will be explained in more detail by means of the following example.

EXAMPLE

The method was carried on scallops caught near the Faroe islands. These scallops are called "Queen Scallops" and their size corresponds to a weight of the edible portion of 3–8 g.

100 kg scallops were immersed for 30 minutes in a 5% sodium hydroxide solution at a temperature of 5°–10° C. Then the scallops, the shells of which were now open, were washed in cold water and immersed in boiling water for 30 seconds. The shell valves were thereby entirely separated and the original contents of the shells consisting of the edible portion with surrounding viscera were in a majority of cases quite separated from the shells and in the remaining few cases, the edible portion with surrounding viscera was attached only weakly to a single valve.

On a shaking screen having a mesh size allowing the passage of the edible portion with the attached viscera but not the passage of the shells, a 100% separation was effected, a complete loosening of the edible portion from the shells being achieved after shaking for only a short time.

The thus isolated scallops consisting of edible portion and viscera were, with a view to removing heavier impurities such as splinters of shells, gravel and the like, placed in a vessel with saturated brine, where the said heavier impurities fell down to the bottom, while the scallops were taken from the surface.

After this further cleaning the scallops were rotated in a drum having walls of rugged perforated plastic, while at the same time being flushed with water. By this treatment the undesirable viscera were removed in the course of about 1 minute and washed away with the flow of water. On the other hand, no substantial amounts of the edible portion were worn away during this rotation treatment.

After being removed from the drum, the scallops were subjected to a further washing and were manually sorted out as usual prior to freezing.

A yield of finished products of 12% based on the weight of raw materials was obtained by the process.

By the known process, where no treatment with potassium or sodium hydroxide solution takes place and where the removal of viscera from the edible portion requires a more intensive mechanical treatment, a yield of only 7.5% is obtained, which, as explained above, is due to a defective separation of the edible portion from the shells and to the fact that the more intensive mechanical processing for removing the viscera from the edible portion results in a substantial waste of the latter.

I claim:

1. A process for shucking and eviscerating scallops by which the shells are caused to open and the edible portion is removed together with the viscera from which it is separated by mechanical treatment, characterized by (a) treating the fresh scallops with an aqueous solution of 0.5–20 w/v % sodium or potassium hydroxide during a period between 1 minute and 2 hours, (b) then treating in a conventional manner the scallops with boiling water or steam for 1 second–5 minutes, preferably 10 seconds–1 minute, (c) isolating the edible portion of the scallops with sourrounding viscera from the shells which are separated after the treatment in step (b), and (d) removing the viscera from the edible portion.

2. A process as claimed in claim 1, characterized by carrying out the step (d) by rotation in a drum having rugged, preferably perforated walls.

3. A process as claimed in claim 1 or 2, characterized in that, at a stage after the treatment (b), the scallops are treated with an acid, preferably hydrochloric acid in a HCl concentration between 0.05 and 2 w/v %.

4. A process as claimed in claim 1 or 2, characterized in that, at a stage after the treatment (b), the scallops are treated with $Ca(OH)_2$.

5. A process as claimed in claim 1, characterized by using in step (b) a time of treatment of 10 seconds–5 minutes, preferably $\frac{1}{4}$–1 minute.

6. A process as claimed in claim 3, characterized by a HCl concentration between 0.05 and 1 w/v %.

* * * * *